(12) United States Patent
Ookubo et al.

(10) Patent No.: US 8,404,016 B2
(45) Date of Patent: Mar. 26, 2013

(54) METHOD FOR REFINING METAL

(75) Inventors: Yasuo Ookubo, Tsukuba (JP); Youichi Hirose, Tsukuba (JP); Hiroshi Nagata, Tsukuba (JP)

(73) Assignee: Ulvac, Inc., Chigasaki-Shi (JP)

( * ) Notice: Subject to any disclaimer, the term of this patent is extended or adjusted under 35 U.S.C. 154(b) by 159 days.

(21) Appl. No.: 13/056,496

(22) PCT Filed: Jul. 30, 2009

(86) PCT No.: PCT/JP2009/003629
§ 371 (c)(1),
(2), (4) Date: Jan. 28, 2011

(87) PCT Pub. No.: WO2010/013484
PCT Pub. Date: Feb. 4, 2010

(65) Prior Publication Data
US 2011/0126670 A1 Jun. 2, 2011

(30) Foreign Application Priority Data
Aug. 1, 2008 (JP) ................ P2008-199846

(51) Int. Cl.
C22B 9/04 (2006.01)
C22B 9/22 (2006.01)
C01B 33/037 (2006.01)

(52) U.S. Cl. ......... 75/10.11; 75/10.13; 75/401; 423/348

(58) Field of Classification Search ........ 75/10.13, 75/10.11, 401; 423/348
See application file for complete search history.

(56) References Cited

U.S. PATENT DOCUMENTS

| 5,454,424 | A | * | 10/1995 | Mori et al. ............. 164/469 |
| 6,231,826 | B1 | | 5/2001 | Hanazawa et al. |
| 6,533,838 | B1 | | 3/2003 | Yamamura et al. |
| 7,687,019 | B2 | | 3/2010 | Yamauchi et al. |
| 7,704,478 | B2 | * | 4/2010 | Yamauchi et al. ....... 423/348 |
| 2005/0074388 | A1 | | 4/2005 | Baluais et al. |

FOREIGN PATENT DOCUMENTS

| CN | 1167728 | 12/1997 |
| DE | 696 21 348 | 9/2002 |
| DE | 10 2006 038 044 | 3/2007 |
| EP | 0 796 820 | 3/1997 |
| EP | 0 869 102 | 5/2002 |
| JP | 61-232295 | 10/1986 |
| JP | 3-20422 | 1/1991 |
| JP | 5-124809 | 5/1993 |
| JP | 8-217436 | 8/1996 |
| JP | 7-309614 | 11/1996 |
| JP | 10-251008 | 9/1998 |
| JP | 10-273313 | 10/1998 |
| JP | 11-209195 | 8/1999 |
| JP | 2000-129372 | 5/2000 |
| JP | 2001-335854 | 12/2001 |
| JP | 2006-206951 | 8/2006 |
| JP | 2006-273669 | 10/2006 |
| JP | 2007-051047 | 3/2007 |
| WO | 2010/018831 | 2/2010 |

OTHER PUBLICATIONS

Office Action from corresponding German Application No. 112009001864.5 dated Mar. 30, 2012. English translation attached.
International Search Report from corresponding PCT Application No. PCT/JP2009/003629 dated Sep. 15, 2009.
"Removal of Metal Impurities in Molten Silicon by Directional Solidification with Electron Beam Heating", Noriyoshi Yuge et al., The Japan institute of Metals, Chiba Japan, 2003, pp. 575-582.
International Search Report from corresponding PCT Application No. PCT/JP2009/064198 dated Nov. 17, 2009.
Office Action from corresponding U.S. Appl. No. 13/058,471 dated Aug. 27, 2012.
Office Action from corresponding Chinese Application No. 2009801305131 dated Aug. 2, 2012. Partial English translation attached.
Office Action from corresponding German Application No. 11 2009 001 953.6 dated Aug. 1, 2012. English translation attached.
Office Action from corresponding Taiwanese Application No. 098127160 dated Jul. 26, 2012. English translation attached.
Office Action from corresponding Taiwanese Application No. 098125964 dated Jul. 23, 2012. English translation attached.

* cited by examiner

*Primary Examiner* — George Wyszomierski
*Assistant Examiner* — Tima M McGuthry Banks
(74) *Attorney, Agent, or Firm* — Grossman, Tucker, Perreault & Pfleger, PLLC

(57) ABSTRACT

A method for refining a metal such that, after a base material derived from the metal is melted by being irradiated with an electron beam, the base material is refined by solidifying the base material which was melted, the method including: a step melting all of the base material by irradiating the electron beam over an entire surface of the base material loaded inside a water-cooled crucible placed inside a high vacuum atmosphere; a step gradually solidifying the base material which was melted from a molten metal bottom part of the base material which was melted toward a molten metal surface part at a side being irradiated by the electron beam by gradually weakening an output of the electron beam while maintaining a condition in which the base material which was melted is irradiated with the electron beam; and a step removing a molten metal part which is not solidified, after the base material which was melted is solidified to a certain percentage.

4 Claims, 1 Drawing Sheet

METHOD FOR REFINING METAL

TECHNICAL FIELD

The present invention relates to a method for refining metal, in which a to-be-refined material (a base material derived from metal) is irradiated with an electron beam. As a result, the to-be-refined material is solidified and purified, thereby turning into metal. In particular, the present invention relates to a method for refining metal, in which a highly-pure silicon (Si) best suited especially for an ingredient for solar battery, including little amount of iron (Fe), aluminum (Al), and calcium (Ca), is solidified and purified.

The present application claims priority on Japanese Patent Application No. 2008-199846, filed Aug. 1, 2008, the content of which is incorporated herein by reference.

BACKGROUND ART

One of the well known solidification purifying process for semiconductors and metal such as silicon and the like is a solidification purifying process using an electron beam melting method. According to this method, as indicated in non-patent document 1, for example, impurities such as phosphorus (P) are vaporized continuously from the to-be-refined material over a water-cooled copper hearth. Then, this to-be-refined material is dripped onto a water-cooled copper casting mold. Next, while an electron beam is irradiated onto a bath level of the dripped to-be-refined material, this to-be-refined material is solidified in one direction from a bottom side of the water-cooled copper casting mold.

However, according to this method, silicon before being solidified and purified is being newly and continuously added constantly to the melt pool of the to-be-refined material (for example, silicon) within the water-cooled copper hearth. Therefore, inside the melt pool, there is a mixture of silicon, from which impurities such as phosphorus are evaporated, and silicon which includes impurities. As a result, according to this method, the purifying effect of the metal is low compared to an instance in which metal is solidified and purified by solidifying in one direction after melting the entire amount of the metal to be solidified and purified (to-be-refined material)

This is because the above solidification purifying process described in the non-patent document 1 is fundamentally the same as the zone melting purifying process. Generally speaking, after the metal to be solidified and purified is melted in its entirety, it is known that, comparing an instance in which the molten metal is solidified in one direction and another instance in which a part of the metal is melted as in zone melting and a solidification is made by sequentially moving the molten zone, the solidification purifying effective rate in the previous instance is higher than the solidification purifying effective rate in the latter instance.

Furthermore, according to the method described in the non-patent document 1 indicated above, as the height of the freeze layer increases, there is a decrease in the temperature gradient of the liquid phase near the phase boundary (solidification interface) between the liquid phase and the solid phase in a direction perpendicular to this solidification interface. As a result, near this solidification interface, a compositional overcooling phenomenon, described later, is more likely to occur. As a matter of fact, an analysis of the density distribution of impurities inside the ingot obtained by an industry level experimental apparatus indicates that the purification effect drops prominently at a position surpassing approximately 50 to 60 percent of the depth of this ingot.

In order to solve the problems described above, a solidification purifying process is suggested using a mechanism in which the water-cooled copper casting mold is rotated. (See, for instance, Non-Patent Document 1 and Patent Document 1.)

However, this method requires a device equipped with a mechanism which rotates the casting mold and reverses the direction of this rotation at an appropriate time interval. Thus, there is a problem in that the equipment becomes too complicated.

Further, in order to actually enhance the purifying effect, it is necessary to rotate the casting mold at a high speed. In this case, there is a problem in that the molten metal (melt pool) might protrude from the casting mold due to centrifugal force.

When the casting mold is not rotated, the silicon forms a thin solidifying layer, i.e., a scull at the wall surface of the water-cooled copper casting mold. Meanwhile, when the casting mold is rotated at a high speed, this scull disappears. Thus, the molten metal of silicon and the copper casting mold contact each other directly. As a result, it becomes difficult to ignore the influence of contamination of silicon due to copper in the casting mold.

As another solidification purifying process of a metal, a method is disclosed such that, a raw material metal (to-be-refined material) is thrown into a water-cooled crucible, the entire surface of the above raw material metal is irradiated with an electron beam, and is melted in its entirety, and thereafter, deflection coil is controlled to narrow the irradiation range of the electron beam. (See Patent Document 2)

According to this solidification purifying process in which the irradiation range of the electron beam is narrowed, a molten metal portion which no longer receives an irradiation of the electron beam sequentially becomes solidified and becomes a solidified portion. Meanwhile, molten metal is left to an end of one side of the water-cooled crucible. The impurity density of this molten metal part is higher than the impurity density of the solidified portion. Therefore, a purified metal may be obtained by removing this molten metal part and extracting only the solidified portion.

However, according to the solidification purifying process by an electron beam disclosed in Patent Document 2, since the irradiation range of the electron beam is gradually narrowed, there is a problem in that the amount of time required for purification increases because it takes time to move the solidification interface to a lateral direction of the water-cooled crucible (a direction perpendicular to the depth direction). Further, the direction in which the solidification interface moves is perpendicular to the direction in which the electron beam is irradiated. At the same time, the temperature gradient of the liquid phase in the direction in which the solidification interface moves is smaller compared to the temperature gradient of the liquid phase in the direction in which the electron beam is irradiated. Therefore, near this solidification interface, a compositional overcooling is more likely to occur. Therefore, there is a problem in that the purification yield cannot be increased unless the solidification speed is slow enough.

In case of silicon, in particular, the equilibrium distribution coefficient of impurity elements (such as iron (Fe) and aluminum (Al) and the like) excluding boron (B) and P is extremely small. As a result, it is known that these impurities may be removed efficiently by a solidification purification. The equilibrium distribution coefficient is a ratio between the impurity density inside a liquid phase and the impurity density inside a solid phase when the impurity is distributed in a completely uniform manner by a convection flow or a diffusion.

However, in actuality, when the molten metal (liquid phase) is solidified at a finite solidification speed considering productivity, the impurities ejected from the solidification interface into the liquid phase is not timely transported uniformly by diffusion or convection. Instead, the impurities are distributed at the solidification interface at a higher density. The distribution coefficient of the impurities considering such a phenomenon, i.e., the value of the effective distribution coefficient at the solidification interface becomes closer to 1 compared to the value of the equilibrium distribution coefficient. Therefore, the effectiveness of purification declines.

Furthermore, in an actual solidification, the melting point of the liquid phase drops due to the impurity which was pushed to the solidification interface and was thickened. Further, according to a coordination relationship between the melting point of a liquid phase corresponding to the concentration distribution of the impurity and the actual temperature distribution, a non-solidified region appears near the solidification interface once the melting point is exceeded.

Such a phenomenon is called a compositional overcooling. Due to this compositional overcooling, the solidification interface becomes unstable, and loses its flatness. As a result, the solidification interface becomes more bumpy (cell growth), and in more extreme cases, the solidification grows in a dendrite form (an arborized form).

In other words, due to compositional overcooling, the crystal of the silicon grows into the liquid phase in a convex form. As a result, the impurities are pushed to both sides. Therefore, the impurity is segregated in a micro perspective, but is rarely segregated in a macro perspective. Therefore, the solidification purifying effect is lost significantly.

In particular, such compositional overcooling is known to be more likely to occur when the temperature gradient of the liquid phase near the solidification interface is small, when the impurity concentration is high, and when the solidification speed of the liquid phase is high.

PRIOR ART DOCUMENT

Patent Document

[Patent Document 1] Japanese Unexamined Patent Application, First Publication No. H10-251008
[Patent Document 2] Japanese Patent No. 3848816

Non-Patent Document

[Non-Patent Document 1] Journal of Metallurgical Society, 67th Edition, 10th Issue, October 2003, pp. 575-582

DISCLOSURE OF INVENTION

Problems to be Solved by the Invention

As described above, the conventional solidification purifying process by an electron beam is either a method in which molten metal is sequentially added, and molten metal is solidified from the lower portion of the container of the casting mold to the upper portion, or a method in which the irradiation range of the electron beam is gradually narrowed, and the solidification interface is moved in a lateral direction of the water-cooled crucible (in a direction perpendicular to the depth direction of the water-cooled crucible). Therefore, there are instances in which the solidification distance of the molten metal becomes long, the time required for the molten metal to be solidified becomes long, and the productivity declines, as well as instances in which the temperature gradient of the liquid phase near the solidification interface in a direction perpendicular to the solidification interface becomes small, and therefore the compositional overcooling phenomenon becomes more likely to occur. As a result, the purification effect of the metal due to solidification declines. Consequently, there is a risk in that the yield ratio becomes low.

The present invention is made in consideration of the problems described above. Accordingly, an object of the present invention is to provide a method for refining metal such that a to-be-refined material (a base material derived from metal), which is to become a metal, may be solidified and purified to a high level of purity within a short amount of time.

Means for Solving the Problems

In order to achieve the above object, a method for refining metal according to the present invention employs the following.

(1) A method for refining a metal according to an aspect of the present invention is a method such that, after a base material derived from the metal is melted by being irradiated with an electron beam, the base material is refined by solidifying the base material which was melted. The method includes: a step melting all of the base material by irradiating the electron beam over an entire surface of the base material loaded inside a water-cooled crucible placed inside a high vacuum atmosphere; a step gradually solidifying the base material which was melted from a molten metal bottom part of the base material which was melted toward a molten metal surface part at a side being irradiated by the electron beam by gradually weakening an output of the electron beam while maintaining a condition in which the base material which was melted is irradiated with the electron beam; and a step removing a molten metal part which is not solidified, after the base material which was melted is solidified to a certain percentage.

(2) The method for refining a metal described in (1) above may be configured as follows: a molten metal depth of the base material which was melted is in a range of 20 mm to 50 mm; and an irradiation density of the electron beam when the base material is melted is in a range of 1000 kW/m² to 3000 kW/m².

(3) The method for refining a metal described in (1) above may be configured as follows: a smaller dimension of a width dimension and a length dimension of the water-cooled crucible is more than four times a depth of the base material which was melted.

(4) The method for refining a metal described in (1) above may be configured as follows: a silicon material is used as the base material.

EFFECTS OF THE INVENTION

According to the method for refining metal described in (1) above, an electron beam is irradiated to the entire surface of the molten metal (liquid phase), while the molten metal is cooled from the bottom surface of the water-cooled crucible. In this instance, since the depth of the molten metal is small, there is an increase in the temperature gradient inside the liquid phase near the solidification interface in a direction perpendicular to the solidification interface. Therefore, it becomes less likely that a compositional overcooling will occur. As a result, the solidification velocity may be set to be large. Furthermore, the traveling distance of the solidification interface is short because the depth of the molten metal is small. Therefore, the time required to solidify and purify the metal may be shortened. Consequently, the productivity may be enhanced.

In general as the solidification of the liquid phase progresses, the impurity concentration within the liquid phase increases. As a result, compositional overcooling is more likely to occur. Therefore, when a certain solidification volume ratio (the ratio of the volume of the solid phase with respect to the volume of the liquid phase) is reached, it is necessary to stop the refinement process and to eject the liquid phase. In this regard, according to the method described in (1) above, there is an increase in the temperature gradient of the liquid phase near the solidification interface in a direction perpendicular to the solidification interface. Therefore, the compositional overcooling is less likely to occur until the solidification volume ratio becomes relatively large. As a result, the yield of the refinement of the metal is enhanced.

EMBODIMENT FOR CARRYING OUT THE INVENTION

Hereunder, an embodiment of a method for refining metal according to the present invention is described in detail with reference to the figures. However, the present invention is not limited by this description. Various alterations are possible in line with the gist of the present invention.

Figure 1A:
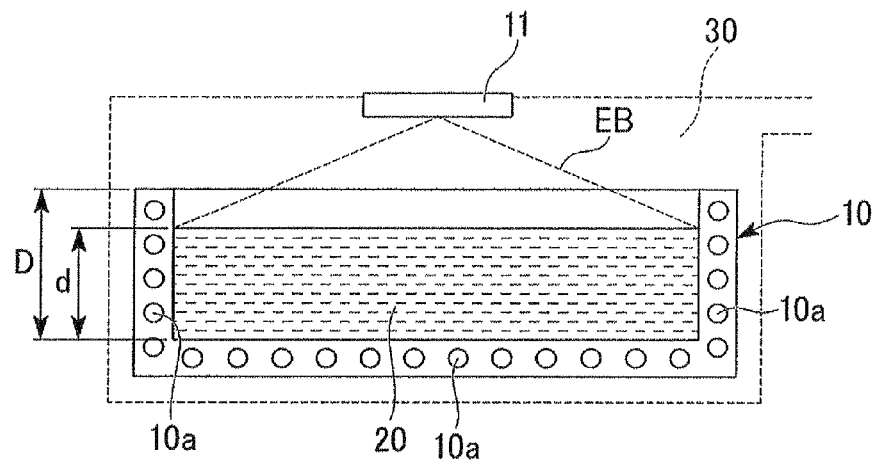
FIG. 1A is a pattern diagram illustrating a sequence of a solidification purification by an electron beam regarding a method for refining metal according to the present invention.
Figure 1B:
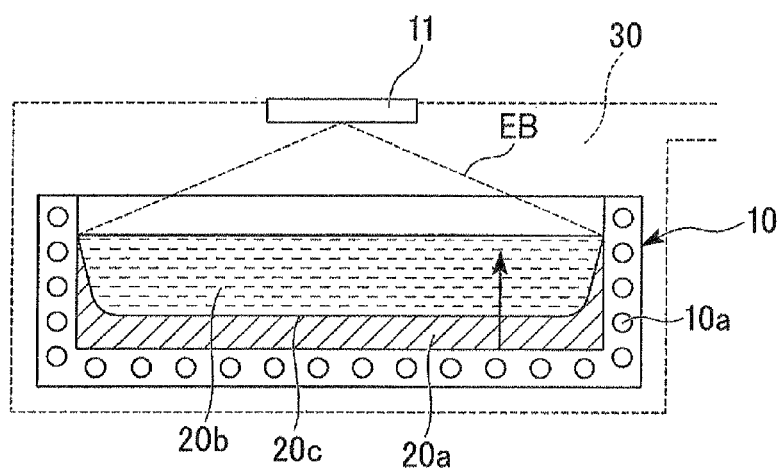
FIG. 1B is a pattern diagram illustrating another step for the sequence.
Figure 1C:
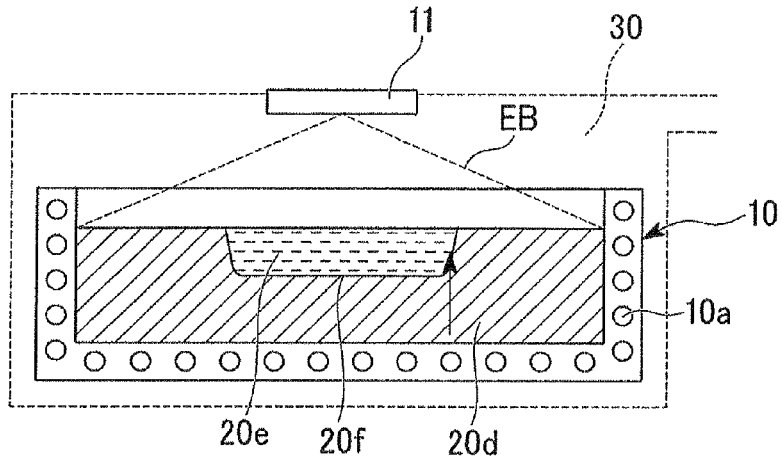
FIG. 1C is a pattern diagram illustrating another step for the sequence.

FIGS. 1A-1C are pattern diagrams illustrating a method for refining metal according to the present invention, and represent a solidification purifying process by an electron beam. Here, metallic silicon is considered to be the to-be-refined material (a base material derived from metal), which will undergo a solidification purifying process. In FIGS. 1A-1C, the water-cooled crucible 10 is a crucible with a shallow bottom. Here, a water-cooled copper hearth with a shallow bottom is used.

A plurality of water paths 10a are formed on each of the bottom part of the water-cooled crucible (water-cooled copper hearth) 10 and the four side parts. These water paths 10a form a water-cooling mechanism provided in the water-cooled copper hearth 10.

The electron beam irradiation device 11 comprises, for example, an electron gun and a deflecting coil. This electron beam irradiation device 11 irradiates an electron beam EB emitted from the electron gun to a to-be-refined material (metal ingredient) loaded inside the water-cooled copper hearth 10. In this way, the electron beam irradiation device 11 melts the metal ingredient. The electron beam irradiation device 11 then freezes the molten metal ingredient, thereby solidifying it.

These water-cooled copper hearth 10 and the electron beam irradiation device 11 are placed in a high atmosphere 30 inside the electron beam melting furnace. Here, it is preferable that the interior of the electron beam melting furnace is at or below $10^{-2}$ Pa.

First, a solidification purifying process of metal is described below.

First, a base material derived from metal (metallic silicon material) is loaded inside the water-cooled copper hearth 10 with a shallow bottom. Here, the metallic silicon material is loaded inside the water-cooled copper hearth 10 so that the depth of the molten metal when the metallic silicon material is melted becomes a predetermined depth d of the molten metal. Here, it is preferable that the predetermined depth d of the molten metal be, for instance, greater than or equal to 20 mm and less than or equal to 50 mm. When the depth d of the molten metal is less than 20 mm, the amount of dissolution for each batch is small, and therefore, the productivity is inadequate. On the other hand, when the depth d of the molten metal is greater than 50 mm, even if the electron beam EB is irradiated to the entire surface of the metallic silicon material loaded in the water-cooled copper hearth 10, the metallic silicon material at the bottom part of the water-cooled copper hearth 10 will not be melted, thereby forming scull. In this way, unrefined silicon will be left.

It is preferable that the water-cooled copper hearth 10 be configured so that the smaller dimension among the width and the length is greater than or equal to four times the depth D of the water-cooled copper hearth 10. When the smaller dimension among the width and the length of the water-cooled copper hearth 10 is less than four times the depth D of the water-cooled copper hearth 10, the area of the water-cooled copper hearth 10 with respect to this depth becomes small. Therefore, a large amount of time is required to melt the metallic silicon material with an electron beam EB. In addition, the amount of dissolution of the metallic silicon becomes small. In this way, the productivity will not be enhanced.

Next, as shown in FIG. 1A, an electron beam EB is irradiated by the electron beam irradiating device 11 to the entire surface of the water-cooled copper hearth 10 loaded with metallic silicon material (the entire surface of the metallic silicon material). In this way, the metallic silicon material is completely melted. As a result, all of the metallic silicon material loaded inside the water-cooled copper hearth 10 becomes a liquid phase silicon (molten metal silicon) 20.

In FIG. 1A, for instance, when the depth d of the molten metal of the pool of the molten metal silicon is 20 mm to 50 mm, it is preferable that the electron beam irradiation density is set to be within a range of 1000 kW/m² to 3000 kW/m², and that the metallic silicon material is melted by the electron beam EB being irradiated to the entire surface of the water-cooled copper hearth 10. When the electron beam irradiation density is less than 1000 kW/m², the metallic silicon material cannot be melted adequately. On the other hand, when the electron beam irradiation density exceeds 3000 kW/m², the cooling capacity of the water path 10a is exceeded. Therefore, there is a risk that, in a later procedure, the liquid phase silicon cannot be cooled adequately.

Next, as shown in FIG. 1A, when the metallic silicon material inside the water-cooled copper hearth 10 is completely dissolved, as shown in FIG. 1B, the irradiation width of the electron beam EB is not changed (i.e., the electron beam EB remains to be irradiated to the entire surface of the molten metal silicon), and the irradiation output (irradiation density) of the electron beam EB is gradually weakened. In this way, the molten metal silicon 20 is gradually solidified from the bottom part of the water-cooled copper hearth 10, and the solid phase part (solidified part) 20a is formed. At this time, impurities such as Fe, Al, and Ca and the like exist primarily inside the non-solidified liquid phase part (molten metal part) 20b. Therefore, the impurity concentration of the liquid phase part (molten metal part) 20b is higher at the molten metal part 20b compared to the solidified part 20a, with the phase boundary (solidification interface) 20c between the solidified part 20a and the molten metal part 20b being the boundary.

In FIG. 1B, impurity such as Fe, Al, Ca, and the like remains primarily inside the liquid phase part (molten metal part) 20b. However, when the solidification velocity is too large, an increasing amount of such impurity will remain inside the solid phase part (solidified part) 20a. As a result, it becomes difficult to obtain silicon having a high degree of purity. Therefore, for instance, the irradiation output of the electron beam EB is weakened gradually so that the solidification velocity of the molten metal silicon becomes less than or equal to 2 mm/min.

In FIGS. 1A to 1C, the depth d of the molten metal of the molten metal silicon is small, and heat is removed well at the bottom part of the water-cooled copper hearth 10. Therefore, when the irradiation output (irradiation density) of the electron beam EB is gradually weakened while the electron beam EB remains being irradiated to the entire surface of the molten metal silicon, it is possible to move the solidification interface from the bottom part of the water-cooled copper hearth 10 in an upper direction in a condition in which the temperature gradient of the liquid phase near the solidification interface in the direction perpendicular to the solidification interface is kept large. In this way, compositional overcooling becomes less likely to occur. Moreover, the solidification interface is prevented from becoming bumpy, and therefore, the purification efficiency of the metal is enhanced.

Next, as shown in FIG. 1C, the output of the electron beam being irradiated to the entire surface of the molten metal silicon is gradually weakened, and the solidification of the molten metal silicon is progressed even further. Therefore, the amount of the solid phase part (solidified part) 20d of the metallic silicon becomes greater than the amount of the liquid phase part (molten metal part) 20e. When the solidification is progressed even further, the molten metal part 20e remains only at the center part of the surface of the pool. The remaining part becomes a solidified part 20d, with the solidification interface 20f being the boundary.

In such a progression of the solidification of the molten metal silicon, when the amount of molten metal part 20e becomes less than the amount of the solidified part 20d, the water-cooled copper hearth 10 is tilted, and the molten metal part 20e is molded (removed). It is preferable that the molten metal part 20e be molded when the molten metal part 20e becomes less than or equal to 30 percent of the entire metallic silicon. It is more preferable if this molten metal part 20e is molded when the molten metal part 20e becomes 20 percent of the entire metallic silicon.

Impurity such as Fe, Al, Ca, and the like exist primarily in the molten metal part 20e. Therefore, the impurity is removed by the above molding. Therefore, by recovering the remaining solidified part 20d, it is possible to obtain a metallic silicon with a high level of purity with a low impurity concentration.

Further, instead of molding the molten part 20e midway, it is possible to perform the molding by first solidifying all of the liquid phase part 20 (20b, 20e), and then re-melting the portion requiring removal. Therefore, the portion being concentrated with impurity may be re-melted and removed. Consequently, the cutting process of the ingot of the manufactured metal becomes unnecessary. As a result, it is possible to lower costs.

According to the present invention, even when the depth of the molten metal silicon is made to be small, the increase in the area of the water-cooled copper hearth 10 and the shortening of the solidification time of the molten metal part create a synergy effect to enhance the productivity of refined metal.

In the present invention, the depth of the molten metal silicon is made small, and the metal is solidified and purified by gradually weakening the irradiation output (irradiation density) of the electron beam while the electron beam is kept irradiating to the entire surface of the molten metal silicon. Therefore, it is possible to increase the temperature gradient of the liquid phase near the solidification interface in a direction perpendicular to the solidification interface. Consequently, even if the solidification velocity of the molten metal silicon is made relatively large, compositional overcooling becomes less likely to occur near the solidification interface. Thus, it is possible to prevent a decline in the purification effectiveness of the metal.

Therefore, according to the present invention, when the solidification velocity is set to a value similar to a solidification velocity used in a conventional method, for example, a solidification velocity of a method in which molten metal is added sequentially and is solidified from a lower part of the container of the casting mold towards the upper direction, or a solidification velocity of a method in which the irradiation width of the electron beam is narrowed and the molten metal is solidified in the width direction of the hearth or the length direction of the hearth, it is possible to maintain a level of refinement purity greater than or equal to these conventional methods.

Moreover, the solidification purification method of metal according to the present invention does not require a mechanism to rotate a casting mold, used in a conventional electron beam melting furnace, and to reverse the direction of this rotation. Therefore, it is possible to simplify the structure inside the furnace.

In this way, according to the solidification purification method of metal based on the present invention, the solidification interface may be progressed in a direction of the depth of the water-cooled copper hearth 10, by gradually weakening the output of the electron beam EB while the electron beam EB is still irradiating the entire surface of the molten metal, and thereby solidifying the metal in liquid phase from the bottom part of the molten metal towards the surface part of the molten metal. Here, there is an increase in the temperature gradient of the liquid phase near the solidification interface in a direction perpendicular to the solidification interface. Therefore, a compositional overcooling becomes less likely to occur at a liquid phase near the solidification interface. As a result, it is possible to prevent the solidification interface from becoming bumpy. At the same time, it is possible to prevent the effectiveness of refining the metal from declining. Further, since the depth of the molten metal is small, the travelling distance of the solidification interface is small. As a result, it is possible to shorten the time required to refine the metal.

In other words, according to the solidification purifying method of metal according to the present invention, it is possible to solidify and purify metal, semiconductor material, and silicon, suitable as an ingredient for solar batteries, in a short amount of time to a high level of purity.

[Embodiments]
Embodiment 1

First, a metallic silicon material including 350 ppm of Fe, 200 ppm of Al, and 7 ppm of Ca as impurity is loaded inside the water-cooled copper hearth. The water-cooled copper hearth has a dimension of D=80 mm in depth, and a dimension of 200 mm in width and length. The amount of metallic silicon material used is an amount such that, when the metallic silicon material is completely melted by the electron beam, the depth d of the molten metal becomes 50 mm.

Next, an electron beam is irradiated to the entire surface of the metallic silicon material which is loaded as described above. Thus, the entire metallic silicon material is melted, and is regarded as the molten metal silicon.

Next, without changing the irradiation width of the electron beam (while keeping the entire surface of the molten metal silicon irradiated with the electron beam), the output of the electron beam is gradually weakened, and the molten metal silicon is solidified from the bottom surface of the water-cooled copper hearth towards the upper side. In this instance, the output of the electron beam is gradually weakened so that the direction of the solidification of the molten metal silicon is a direction of the depth of the water-cooled copper hearth, and so that the solidification velocity equals 2 mm/min.

Further, once the amount of the molten metal part of the molten metal silicon is 20 percent of the entirety, the water-cooled copper hearth is tilted, and the molten metal part is molded (removed).

Next, a sample is obtained from the silicon ingot remaining on the water-cooled copper hearth, and each impurity concentration was measured. The sample is obtained from near the bottom surface of the water-cooled copper hearth (crucible) of the silicon ingot, a central part of the thickness direction of the silicon ingot, and near the upper surface of the silicon ingot. The measurement results are indicated in Table 1 below.

TABLE 1

|  | Fe (ppm) | Al (ppm) | Ca (ppm) |
|---|---|---|---|
| NEAR BOTTOM SURFACE OF CRUCIBLE | <0.1 | <0.1 | <0.1 |
| CENTRAL PART OF THICKNESS DIRECTION | <0.1 | <0.1 | <0.1 |
| NEAR UPPER SURFACE | 0.3 | 0.2 | <0.1 |

COMPARATIVE EXAMPLE 1

The solidification purifying process of the metallic silicon was carried out similarly to Embodiment 1 except that, when the molten metal silicon is solidified, the molten metal silicon was solidified by gradually narrowing the irradiation width (surface) of the electron beam from one side of the side surface of the water-cooled copper hearth towards the other side surface. In this instance, the irradiation surface of the electron beam was narrowed so that the solidification velocity of the molten metal silicon in a lateral direction of the water-cooled copper heart (the width direction or a length direction) equals 2 mm/min, which is the same as in Embodiment 1.

Next, a sample was obtained from near the solidification starting point of the silicon ingot remaining on the water-cooled copper hearth, near a central part of the length direction of the solidification, and near the solidification end point. Each impurity concentration was measured. The measurement results are indicated in Table 2 below.

TABLE 2

|  | Fe (ppm) | Al (ppm) | Ca (ppm) |
|---|---|---|---|
| NEAR SOLIDIFICATION STARTING POINT | <0.1 | <0.1 | <0.1 |

TABLE 2-continued

|  | Fe (ppm) | Al (ppm) | Ca (ppm) |
|---|---|---|---|
| CENTRAL PART | 0.4 | 0.2 | <0.1 |
| NEAR SOLIDIFICATION END POINT | 2.5 | 0.8 | <0.1 |

The impurity concentration of the sample obtained from near the solidification starting point in Comparative Example 1 was equivalent to each sample obtained in Embodiment 1. Meanwhile, considering the samples obtained from the central part and near the solidification end point of the ingot in Comparative Example 1, the concentration of Fe and Al was higher compared to each sample obtained in Embodiment 1. Furthermore, while the refinement time in Embodiment 1 was approximately 20 minutes, the refinement time in Comparative Example 1 was 80 minutes, which was four times large. In this way, the cost of refinement increased.

Embodiment 2

First, a metallic silicon material having a higher concentration of impurity compared to Embodiment 1 was loaded inside a water-cooled copper hearth in a manner similar to Embodiment 1 so that the depth of the molten metal becomes 50 mm. The water-cooled copper hearth has a dimension of D=80 mm in depth, and a dimension of 200 mm in width and length. The metallic silicon material used in the present embodiment contains 620 ppm of Fe, 360 ppm of Al, and 24 ppm of Ca as impurity.

Next, in a manner similar to Embodiment 1, the metallic silicon material is completely melted by the electron beam, the output of the electron beam is weakened gradually, and the molten metal silicon is solidified. According to the present embodiment, the output of the electron beam is gradually weakened so that the solidification velocity of the molten metal silicon equals 1 mm/min. Further, when the amount of the molten metal part of the molten metal silicon equals 30 percent of the entirety, the water-cooled copper hearth is tilted, and the molten metal part is molded.

Next, a sample is obtained from the silicon ingot remaining on the water-cooled copper hearth, in a manner similar to Embodiment 1, and each impurity concentration was measured. The measurement results are indicated in Table 3 below.

TABLE 3

|  | Fe (ppm) | Al (ppm) | Ca (ppm) |
|---|---|---|---|
| NEAR BOTTOM SURFACE OF CRUCIBLE | <0.1 | <0.1 | <0.1 |
| CENTRAL PART OF THICKNESS DIRECTION | <0.1 | <0.1 | <0.1 |
| NEAR UPPER SURFACE | 0.5 | 0.3 | <0.1 |

COMPARATIVE EXAMPLE 2

The solidification purifying process of the metallic silicon was carried out similarly to Embodiment 2 except that, when the molten metal silicon is solidified, the molten metal silicon was solidified by gradually narrowing the irradiation width (surface) of the electron beam from one side of the side surface of the water-cooled copper hearth towards the other side surface. In this instance, the irradiation surface of the electron beam was narrowed so that the solidification velocity of the molten metal silicon in a lateral direction of the water-cooled copper heart (the width direction or a length direction) equals 1 mm/min, which is the same as in Embodiment 2.

Next, a sample was obtained from near the solidification starting point of the silicon ingot remaining on the water-cooled copper hearth, near a central part of the length direction of the solidification, and near the solidification end point. Each impurity concentration was measured. The measurement results are indicated in Table 4 below.

TABLE 4

|  | Fe | Al | Ca |
|---|---|---|---|
| NEAR SOLIDIFICATION STARTING POINT | <0.1 | <0.1 | <0.1 |
| CENTRAL PART | 1.4 | 0.7 | <0.1 |
| NEAR SOLIDIFICATION END POINT | 22.6 | 3.2 | 0.8 |

The impurity concentration of the sample obtained from near the solidification starting point in Comparative Example 2 was equivalent to each sample obtained in Embodiment 2. Meanwhile, considering the sample obtained from the central part of the ingot in Comparative Example 2, the concentration of Fe and Al was higher compared to each sample obtained in Embodiment 2. Moreover, considering the sample obtained from near the solidification end point of the ingot, the concentration of Fe, Al, and Ca was all higher compared to each sample obtained in Embodiment 2. Furthermore, while the refinement time in Embodiment 2 was approximately 35 minutes, the refinement time in Comparative Example 2 was 140 minutes, which was four times large. In this way, the cost of refinement increased.

COMPARATIVE EXAMPLE 3

Metallic silicon was refined in a manner similar to Embodiment 1, except that the molten metal part was molded by using a graphite crucible instead of a water-cooled copper hearth, the graphite crucible was tilted when the molten metal part of the metallic silicon became 30 percent of the entirety.

Next, a sample was obtained from the silicon ingot remaining inside the graphite crucible in a manner similar to Embodiments 1 and 2. Thus, each impurity concentration was measured. The measurement results are indicated in Table 5 below.

TABLE 5

|  | Fe | Al | Ca |
|---|---|---|---|
| NEAR BOTTOM SURFACE OF CRUCIBLE | <0.1 | <0.1 | <0.1 |
| CENTRAL PART OF THICKNESS DIRECTION | 1.5 | 1.2 | 0.3 |
| NEAR UPPER SURFACE | 38 | 12 | 0.6 |

According to Table 5 above, when the graphite crucible (graphite hearth) was used, there was clearly an increase in the impurity concentration in the samples obtained from near the upper surface of the obtained silicon ingot and from the central part in the width direction. Further, the refinement yield declined. This is because heat cannot be removed from the bottom surface of the graphite crucible, and as a result, the temperature gradient of the liquid phase near the solidification interface in a direction perpendicular to the solidification interface is small, thereby making it more likely that a compositional overcooling occurs near the solidification interface. Therefore, it is preferable to use a water-cooled copper hearth as a water-cooled crucible used in the solidification refining method of the metal according to the present invention.

INDUSTRIAL APPLICABILITY

According to a solidification refining method of a metal according to the present invention, it is possible to solidify and purify a metal, semiconductor material, and silicon suitable as an ingredient for a solar battery to a high level of purity within a short amount of time.

DESCRIPTION OF REFERENCE SYMBOLS

| 10 | Water-cooled crucible (Water-cooled copper hearth) |
| 10a | Water path |
| 11 | Electron beam irradiation device |
| 20 | Liquid phase silicon (Molten metal silicon) |
| 20a, 20d | Solid phase part (Solidified part) |
| 20b, 20e | Liquid phase part (Molten metal part) |
| 20c, 20f | Solidification interface |
| 30 | High vacuum atmosphere |
| EB | Electron beam |

The invention claimed is:

1. A method for refining a metal such that, after a base material derived from the metal is melted by being irradiated with an electron beam, the base material is refined by solidifying the base material which was melted, the method comprising:
   a step melting all of the base material by irradiating the electron beam over an entire surface of the base material loaded inside a water-cooled crucible placed inside a high vacuum atmosphere;
   a step gradually solidifying the base material which was melted from a molten metal bottom part of the base material which was melted toward a molten metal surface part at a side being irradiated by the electron beam by gradually weakening an output of the electron beam while maintaining a condition in which the base material which was melted is irradiated with the electron beam; and
   a step removing a molten metal part which is not solidified, after the base material which was melted is solidified to a certain percentage.

2. A method for refining a metal according to claim 1, wherein:
   a molten metal depth of the base material which was melted is in a range of 20 mm to 50 mm; and
   an irradiation density of the electron beam when the base material is melted is in a range of 1000 kW/m$^2$ to 3000 kW/m$^2$.

3. A method for refining a metal according to claim 1, wherein
   a smaller dimension of a width dimension and a length dimension of the water-cooled crucible is more than four times a depth of the base material which was melted.

4. A method for refining a metal according to claim 1, wherein a silicon material is used as the base material.

* * * * *